(12) United States Patent
Schel

(10) Patent No.: US 11,466,746 B2
(45) Date of Patent: Oct. 11, 2022

(54) DAMPER ASSEMBLY

(71) Applicant: DRiV Automotive Inc., Lake Forest, IL (US)

(72) Inventor: Jacobus Schel, Overasselt (NL)

(73) Assignee: DRiV Automotive Inc., Skokie, IL (US)

( * ) Notice: Subject to any disclaimer, the term of this patent is extended or adjusted under 35 U.S.C. 154(b) by 81 days.

(21) Appl. No.: 16/994,117

(22) Filed: Aug. 14, 2020

(65) Prior Publication Data

US 2022/0049754 A1 Feb. 17, 2022

(51) Int. Cl.
| | |
|---|---|
| *B60G 17/08* | (2006.01) |
| *F16F 9/18* | (2006.01) |
| *F16F 9/346* | (2006.01) |
| *F16F 9/36* | (2006.01) |
| *F16F 9/34* | (2006.01) |
| *F16F 9/32* | (2006.01) |
| *F16F 9/50* | (2006.01) |
| *F16F 9/19* | (2006.01) |
| *B60G 13/08* | (2006.01) |

(52) U.S. Cl.
CPC ............ *F16F 9/185* (2013.01); *F16F 9/19* (2013.01); *F16F 9/325* (2013.01); *F16F 9/3271* (2013.01); *F16F 9/34* (2013.01); *F16F 9/346* (2013.01); *F16F 9/369* (2013.01); *F16F 9/50* (2013.01); *B60G 13/08* (2013.01); *B60G 2202/24* (2013.01); *B60G 2206/41* (2013.01); *B60G 2206/70* (2013.01); *B60G 2206/8201* (2013.01); *B60G 2500/11* (2013.01); *B60G 2800/162* (2013.01); *F16F 2222/12* (2013.01); *F16F 2224/0208* (2013.01); *F16F 2226/048* (2013.01); *F16F 2228/066* (2013.01)

(58) Field of Classification Search
CPC ...... F16F 9/003; F16F 9/36; F16F 9/45; F16F 9/187; B60G 17/08
USPC ............ 188/313–315, 322.13, 322.19, 322.2
See application file for complete search history.

(56) References Cited

U.S. PATENT DOCUMENTS

| | | | | |
|---|---|---|---|---|
| 5,195,619 A | * | 3/1993 | Dourson | F16F 9/003 188/266.3 |
| 5,960,915 A | | 10/1999 | Nezu et al. | |

(Continued)

FOREIGN PATENT DOCUMENTS

DE 102014211699 A1 12/2015

*Primary Examiner* — Christopher P Schwartz
(74) *Attorney, Agent, or Firm* — DRiV Automotive Inc.

(57) ABSTRACT

A damper includes a pressure tube extending about a longitudinal axis and defining an inner volume. The damper includes a piston attached to a piston rod and slidably disposed within the pressure tube. The piston divides the inner volume of the pressure tube into a first working chamber and a second working chamber. The damper includes a fluid connector having a first wall and a second wall, each elongated along the longitudinal axis and sealed to the pressure tube. The fluid connector has a third wall elongated along the longitudinal axis and extending from the first wall to the second wall. The pressure tube defines an opening at the first working chamber, and the third wall of the fluid connector defines an opening spaced from the opening of the pressure tube. The first wall, the second wall, and the third wall define a passage extending from the opening of the pressure tube to the opening of the third wall.

20 Claims, 5 Drawing Sheets

(56) References Cited

U.S. PATENT DOCUMENTS

| | | |
|---|---|---|
| 7,997,588 B2 | 8/2011 | Ohnuma et al. |
| 10,107,349 B2 | 10/2018 | Murakami et al. |
| 2019/0001783 A1 | 1/2019 | Garcia et al. |
| 2019/0136932 A1 | 5/2019 | Deferme |
| 2019/0351724 A1* | 11/2019 | Roessle ................. B60G 17/08 |
| 2021/0054902 A1* | 2/2021 | Nakano .................. F16F 9/187 |

\* cited by examiner

DAMPER ASSEMBLY

BACKGROUND

Dampers are typically used in conjunction with automotive suspension systems or other suspension systems to control movement of wheels of a vehicle relative to a body of the vehicle. In order to control movement, dampers are generally connected between the sprung (body) and the unsprung (suspension/drivetrain) masses of the vehicle. Each damper controls movement of respective wheels by limiting fluid flow into, out of, and/or between working chambers of the dampener. Fluid movement is caused by a movement of a piston within a pressure tube of the dampener, e.g., when the damper is moved toward a compressed or extended position.

DETAILED DESCRIPTION

Figure 1:
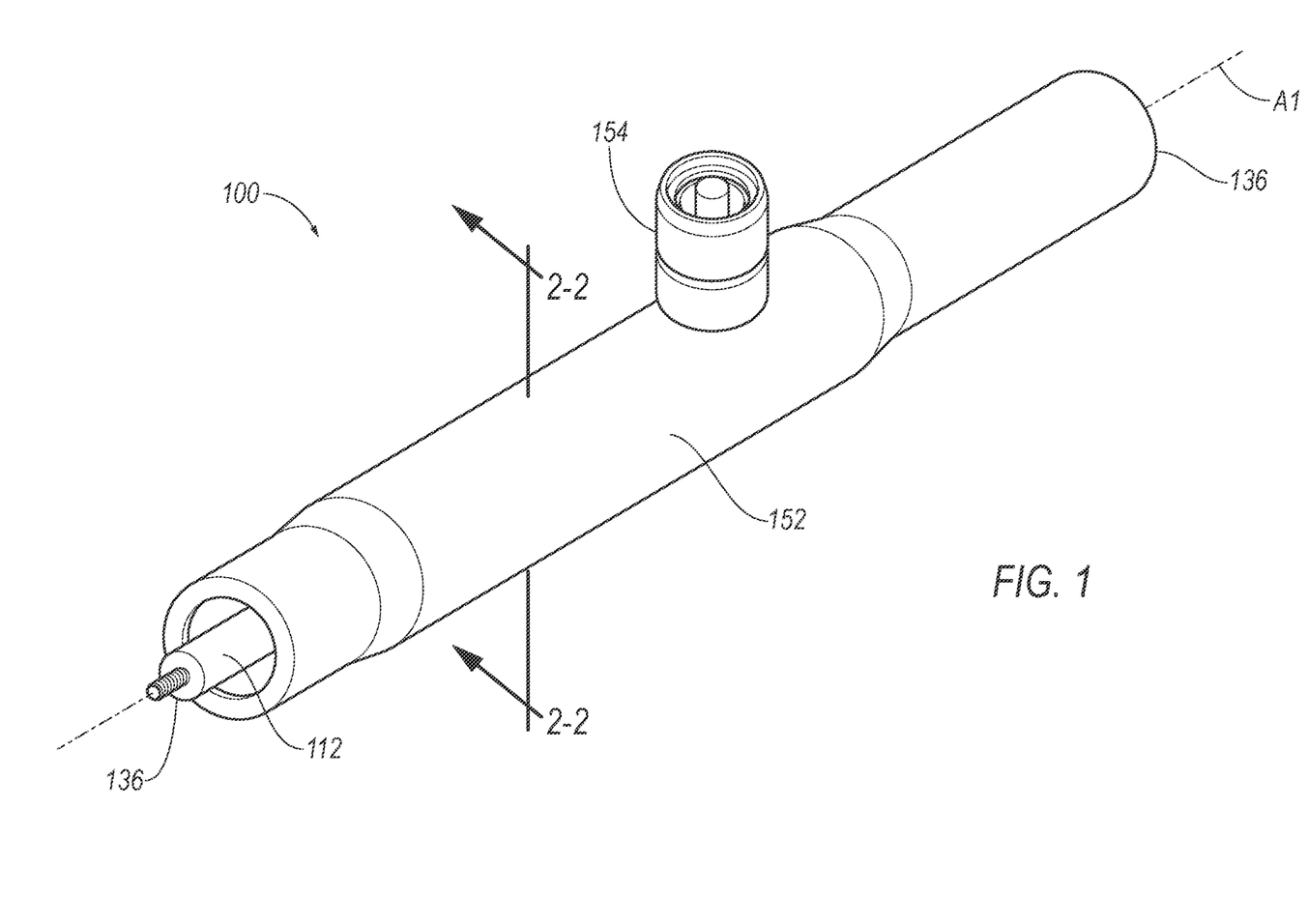
FIG. 1 is a perspective view of a damper.
Figure 2:
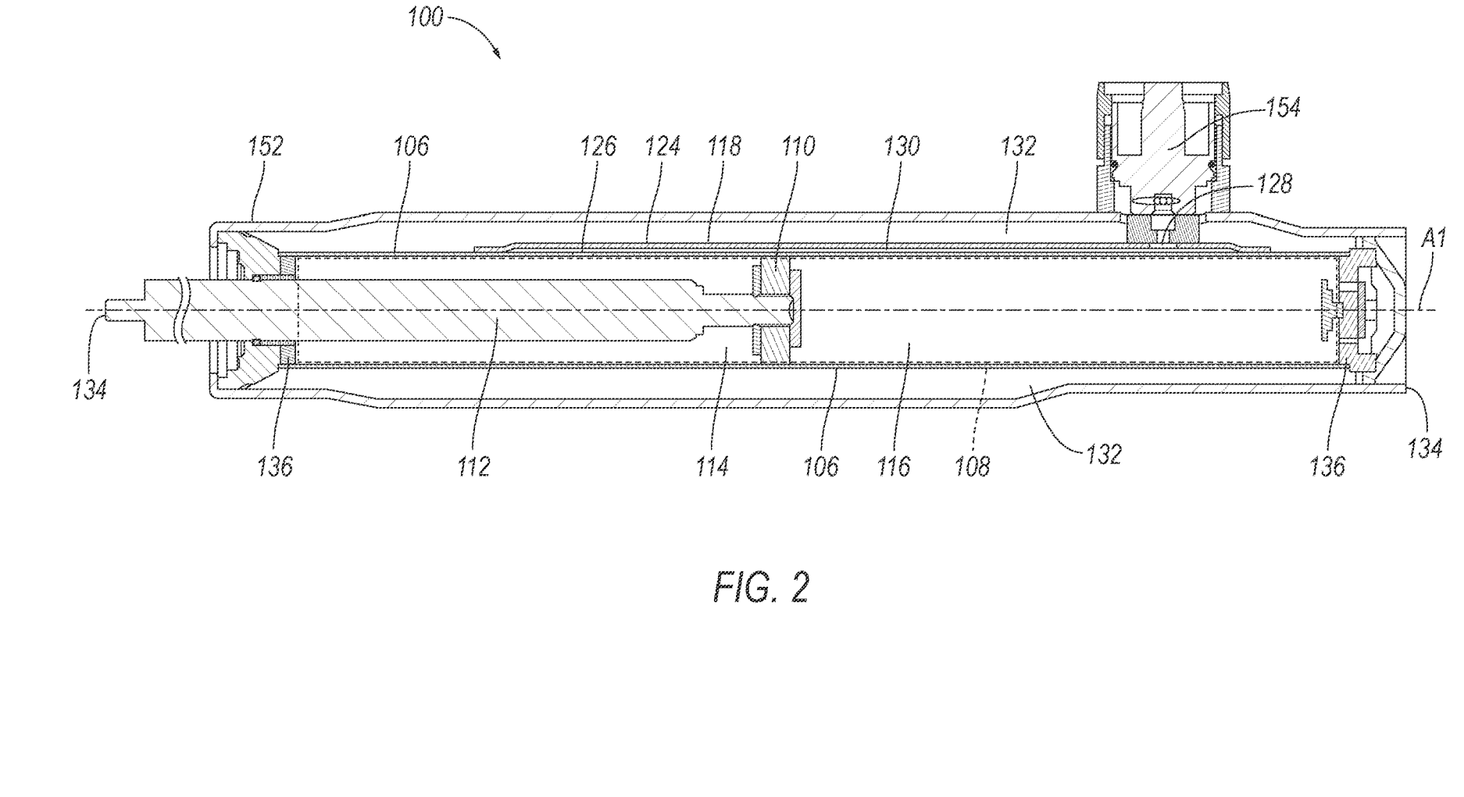
FIG. 2 is a cross section of the damper along a plane 2-2 shown in FIG. 1.
Figure 3:
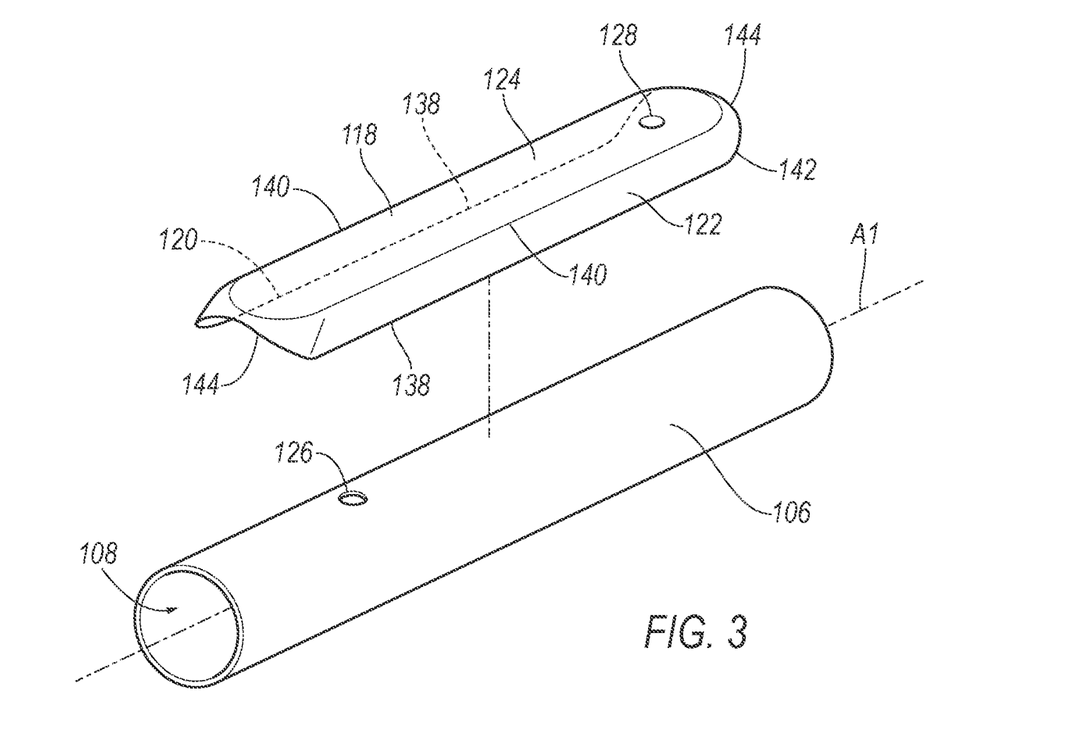
FIG. 3 is an exploded view of a pressure tube and a fluid connector of the damper.
Figure 4:
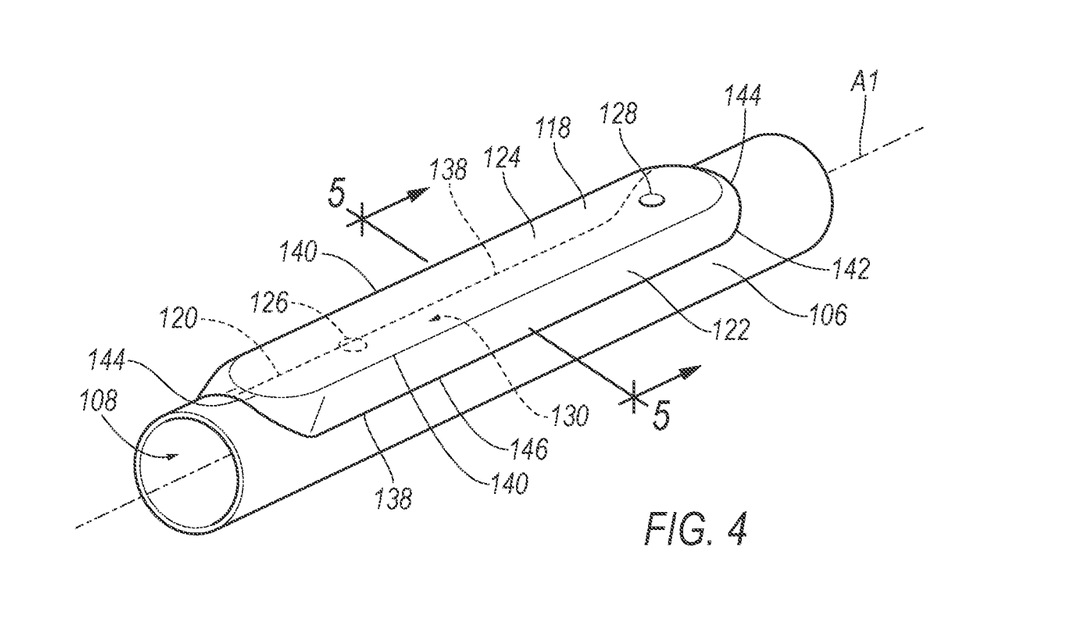
FIG. 4 is a perspective view of the fluid connector fixed to the pressure tube with a weld.
Figure 5:
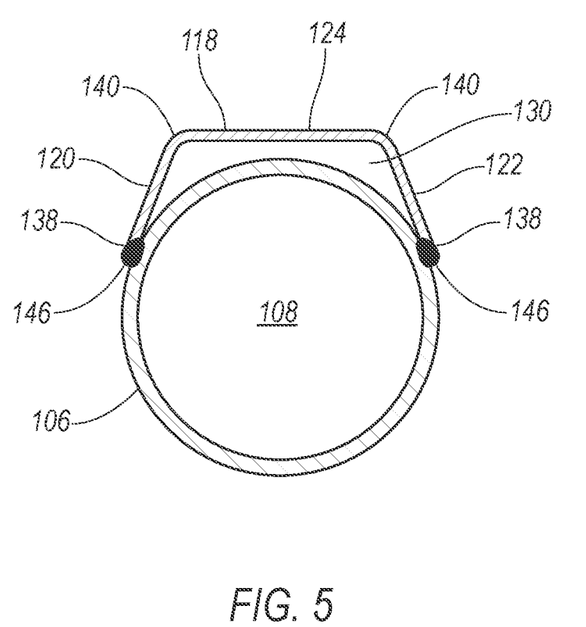
FIG. 5 is a cross section along a plane 5-5 shown in FIG. 4.
Figure 6:
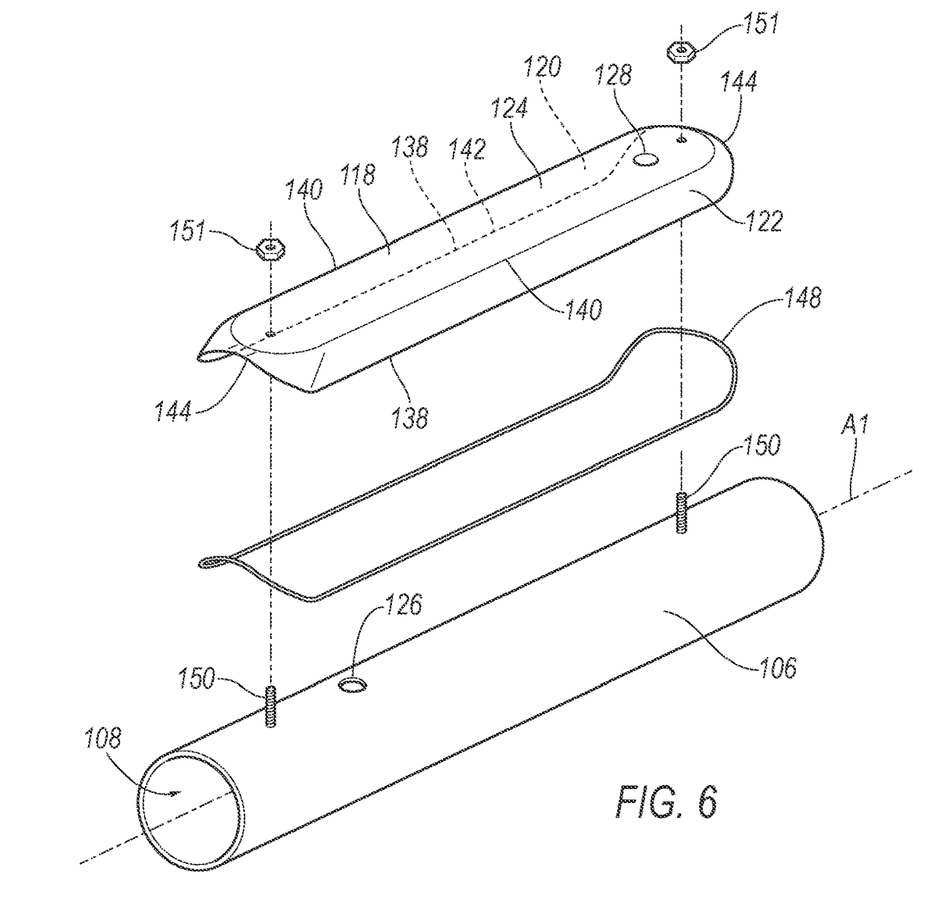
FIG. 6 is an exploded view of a pressure tube, a fluid connector, and a gasket of the damper.
Figure 7:
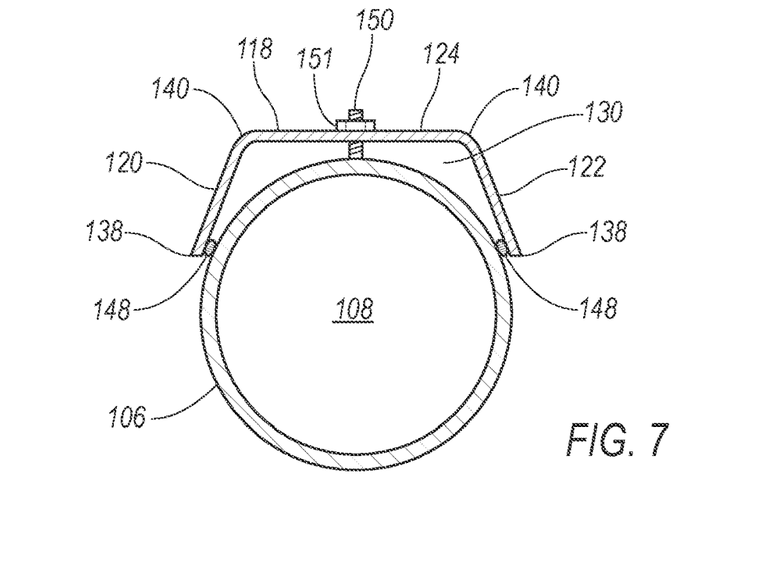
FIG. 7 is a cross section of the pressure tube and fluid connector of FIG. 6 fixed together with a fastener.

With reference to FIGS. 1 and 2, a damper 100 for controlling movement of a wheel of a vehicle includes a pressure tube 106 extending about a longitudinal axis A1 and defining an inner volume 108. The damper 100 includes a piston 110 attached to a piston rod 112 and slidably disposed within the pressure tube 106, the piston 110 dividing the inner volume 108 of the pressure tube 106 into a first working chamber 114 and a second working chamber 116. With reference to FIGS. 3-7, the damper 100 includes a fluid connector 118 having a first wall 120 and a second wall 122, each elongated along the longitudinal axis A1 and sealed to the pressure tube 106, the fluid connector 118 having a third wall 124 elongated along the longitudinal axis A1 and extending from the first wall 120 to the second wall 122. The pressure tube 106 defines a first opening 126 at the first working chamber. The third wall 124 of the fluid connector 118 defines a second opening 128 spaced from the first opening 126 of the pressure tube 106. The first wall 120, the second wall 122, and the third wall 124 define a passage 130 extending from the first opening 126 of the pressure tube 106 to the second opening 128 of the third wall.

The fluid connector 118 provides fluid flow between the first working chamber 114 and a valve 154. The valve 154 controls fluid flow from the fluid connector 118 to the reserve chamber 132 of the damper 100. The passage 130 defined by the walls 120, 122, 124 of the fluid connector 118 may be of lower volume and have a more direct path between the openings 126, 128 as compared to conventional passages, e.g., defined by a tube surrounding a pressure tube (not shown). The lower volume and more direct path may increase performance characteristics of the damper 100 with the fluid connector 118, e.g., compared to conventional designs. Additionally or alternatively, damper 100 with the fluid connector 118 may require less material, be easier to assemble, and have other manufacturing efficiencies compared to conventional designs.

The vehicle may be any suitable type of wheeled transport, e.g., a passenger or commercial automobile such as a sedan, a coupe, a truck, a sport utility vehicle, a crossover vehicle, a van, a minivan, a taxi, a bus, a motorcycle, etc. The vehicle, for example, may be an autonomous vehicle. In other words, the vehicle may be autonomously operated such that the vehicle may be driven without constant attention from a driver, i.e., the vehicle may be self-driving without human input.

The damper 100 defines the longitudinal axis A1 extending between ends 134 of the damper 100. The damper 100 may be elongated along the longitudinal axis A1. The terms "axially," "radially," and "circumferentially" used herein are relative to the longitudinal axis A1 defined by the damper 100. The damper 100 is movable from a compressed position to an extended position, and vice versa. A distance between the ends 134 of the damper 100 is less in the compressed position than in the extended position. Springs or the like may urge the damper 100 toward the extended position. Force applied to wheels of the vehicle, e.g., from bumps, potholes, etc., may urge to damper 100 toward the compressed position.

The pressure tube 106, shown in FIGS. 2-7, may be elongated along the longitudinal axis A1 of the damper 100, i.e., the pressure tube 106 may be hollow and tubular. The inner volume 108 is surrounded by the pressure tube 106. For example, the inner volume 108 may be a hollow circumferentially surrounded by the tubular shape of pressure tube 106. Axially spaced ends 136 of the pressure tube 106 may further define and enclose the inner volume 108, e.g., via a plug, gasket, cap, or other suitable structure.

The pressure tube 106 may be metal, or any suitable material. The pressure tube 106 is filled with a fluid, e.g., an incompressible hydraulic fluid. Movement of the damper 100, e.g., to the extended or compressed position, may increase and/or decrease fluid pressure in the pressure tube 106, e.g., in the first working chamber 114 and the second working chamber.

The first opening 126 defined by the pressure tube 106 permits fluid to flow out of the first working chamber 114 of the inner volume 108, e.g., to the passage 130 defined by the fluid connector 118. The first opening 126 may extend radially from an inner surface to an outer surface of the pressure tube 106 at the first working chamber 114. The first opening 126 may be circular, or and suitable shape. The pressure tube 106 may define multiple first openings 126, e.g., of various shapes and sizes.

With reference again to FIGS. 1 and 2, the piston 110 divides the inner volume 108 of the pressure tube 106 into the first working chamber 114 and the second working chamber 116. An outer surface of the piston 110 may be sealed to the inner surface of the pressure tube 106. The piston 110 may include passages, discs, or other structure (not shown) that permit fluid to flow through the piston 110 from the first working chamber 114 to the second working chamber 116, or vice versa, in a controlled manner.

The piston 110 is attached to the piston rod 112, i.e., such that the piston 110 and piston rod 112 move generally in unison. The piston 110 may be fixed to the piston rod 112, e.g., via a fastener, weld 146, friction fit, etc. The piston 110 and the piston rod 112 may be metal, plastic, or any suitable material. The piston rod 112 may be elongated along the longitudinal axis A1 of the damper 100. The piston rod 112 extends away from the piston 110 within the inner volume 108 of the pressure to outside the inner volume 108 of the pressure tube 106. The piston rod 112 connects the piston 110 to one of the ends 136 of the damper 100, i.e., such that piston 110 is moved when the damper 100 is moved toward the compressed position or the extended position.

The piston 110 and piston rod 112 are slidable within the inner volume 108 of the pressure tube 106 and the along the longitudinal axis A1. Sliding the piston 110 along the longitudinal axis A1 varies volumes of the working chambers. For example, when the damper 100 is moved toward the extended position movement of the piston rod 112 moves the piston 110 and a volume of the first working chamber 114 is reduced and a volume of the second working chamber is increased. As another example, when the damper 100 is moved toward the retracted position movement of the piston rod 112 moves the piston 110 and the volume of the first working chamber 114 is increased and the volume of the second working chamber 116 is reduced.

The fluid connector 118, shown in FIGS. 2-7, guides a flow of fluid between the first working chamber 114 and the valve 154 via the passage 130 defined by the first wall, the second wall 122, and the third wall 124. Each of the first wall 120, the second wall, and the third wall 124 of the fluid connector 118 are elongated along the longitudinal axis A1. In other words, a length of each of the first wall 120, the second wall 122, and the third wall 124 along the longitudinal axis A1 is greater than a width of each of the first wall 120, the second wall 122, and the third wall 124 perpendicular to the longitudinal axis A1.

The first wall 120 and the second wall 122 each include a first edge 138 at the pressure tube 106. The first edges of the first wall 120 and the second wall 122 at the pressure tube 106 are elongated along the longitudinal axis A1. The first wall 120 and the second wall 122 each include a second edge 140 spaced from the pressure tube 106. The second edges 140 of the first wall 120 and the second wall 122 spaced from the pressure tube 106 are elongated along the longitudinal axis A1. The first wall 120 and second wall 122 each extend from the respective first edge 138 to the respective second edge 140, e.g., defining the widths of the first wall 120 and the second wall 122. The first wall 120 and the second wall 122 may each extend perpendicular to the longitudinal axis A1. For example, the first edge 138 may be spaced from the second edge 140 perpendicular to the longitudinal axis A1.

The third wall 124 extends from the first wall 120 to the second wall 122, e.g., from the second edge 140 of the first wall 120 to the second edge 140 of the second wall 122. The third wall 124 may be planar, e.g., having a flat outer surface. The second edges 140 may rounded, e.g., defining a radius between the first wall 120 and the third wall 124, and between the second wall 122 and the third wall 124. The first wall 120, the second wall 122 and the third wall 124 may be arcuate and continuous, e.g., without the second edges 140 providing a distinct delineation between the first wall 120 and the third wall 124, and between the second wall 122 and the third wall 124. The fluid connector 118 may be unitary. Unitary means a single, uniform piece of material with no seams, joints, fasteners, or adhesives holding the first wall 120, the second wall 122, and the third wall 124 together, i.e., formed together simultaneously as a single continuous unit, e.g., by machining from a unitary blank, molding, forging, casting, etc. Non-unitary components, in contrast, are formed separately and subsequently assembled, e.g., by threaded engagement, welding, etc.

The second opening 128 defined by the third wall 124 permits fluid to flow into, and out of, the passage 130 defined by the fluid connector 118. The second opening 128 is in fluid communication with the valve 154, e.g., such that fluid may from the passage 130 to the valve 154 via the second opening 128. The second opening 128 may extend radially from an inner surface to an outer surface of the third wall 124. The second opening 128 may be circular, or and any suitable shape. The second opening of the third wall 124 may be spaced from the first opening 126 of the pressure tube 106 along the longitudinal axis A1. The second opening 128 of the third wall 124 may be spaced from the first opening 126 of the pressure tube 106 toward the second working chamber 116. For example, the second opening 128 may be farther from the piston rod 112 than the first opening 126, e.g., the piston rod 112 may extend from between the first opening 126 and the second opening 128 away from the second opening 128 beyond the first opening. As shown in FIGS. 3, 4, 6, and 7, the first opening 126 and second opening 128 may be circumferentially aligned with each other relative to the longitudinal axis A1. Alternately, the first opening 126 and second opening 128 may be circumferentially spaced from each other relative to the longitudinal axis A1 (not shown).

The fluid connector 118 defines a perimeter 142. The perimeter 142 extends about the fluid connector 118, e.g., along the first edges 138 of the first wall 120 and the second wall 122, and from one first edge 138 to the other first edge 138 at opposing distal ends 144 of the fluid connector 118. The perimeter 142 conforms to the pressure tube 106, i.e., such that a three-dimensional shape of the perimeter 142 generally mirrors a three-dimensional shape of the outer surface of the pressure tube 106, e.g., where the perimeter 142 of the fluid connector 118 abuts the outer surface of the pressure tube. For example, the perimeter 142 may be linear along the first wall 120 and the second wall 122, e.g., parallel to the longitudinal axis A1 and along the first edges 138. The perimeter 142 may be arcuate between the first wall 120 and the second wall 122, e.g., between the first edges at the distal ends 144. A radius of curvature of the perimeter 142 at the distal ends 144 may be generally equal to a radius of curvature of the outer surface of the pressure tube 106 where the distal ends 144 abut the outer surface of the pressure tube 106.

The fluid connector 118 is sealed to the pressure tube 106, i.e., to inhibit flow of fluid therebetween. For example, the first wall 120 and the second wall 122 of the fluid connector 118 may be sealed to the outer surface of the pressure tube 106 along the first edges 138. As another example, the fluid connector 118 may be sealed to the outer surface about the perimeter 142, e.g., along the first edges and distal ends 144. The fluid connector 118 may sealed, for example and with reference to FIGS. 4 and 5, to the pressure tube 106 with a weld 146 that extends completely about the perimeter 142. As another example, and with reference to FIGS. 6 and 7, a gasket 148 may be disposed between the outer surface of the pressure to and the fluid connector 118. The gasket 148 may be compressed between the outer surface and fluid connector 118. The gasket 148 may extend completely about the perimeter 142, e.g., along the first edges and distal ends 144. The gasket 148 may be rubber, or any suitable material for sealing the pressure tube 106 to the fluid connector.

The fluid connector 118 may be fixed to the pressure tube 106 at the perimeter 142, e.g., via the weld 146, adhesive, fastener, etc. For example, the fastener may include a post 150 welded to the outer surface of the pressure tube 106. The post 150 of the fastener may extend through the fluid connector 118. A nut 151 of the fastener may threadingly engage the post 150 and secure the fluid connector 118 against the outer surface of the pressure tube 106. As another example, the fastener may be a clamp that circumferentially surrounds the pressure tube 106 and the fluid connector 118, or any suitable structure (not shown).

The passage 130 defined by the fluid connector 118 guides fluid from the first opening 126 of pressure tube 106 to the second opening 128 of the third wall 124, e.g., the passage 130 extends from the first opening to the second opening 128. The first wall 120, the second wall 122, and the third wall 124 define the passage 130 therebetween. The pressure tube may further define the passage 130. For example, the first wall 120 and the second wall may define sides of the passage 130, the third wall 124 may define a top of the passage 130, and the pressure tube 106 may define a bottom of the passage 130. The distal ends 136 of the fluid connector 118 may further enclose the passage. A cross-sectional area of the passage 130 may vary along the longitudinal axis A1. For example, the third wall 124 may be closer to, or farther from, the pressure tube 106 at the first opening 126 than at the second opening 128 and/or a distance between the first wall 120 and the second wall 122 may be greater or lesser at the first opening 126 than at the second opening 128 (not shown).

With reference again to FIGS. 1 and 2, the damper 100 can include a reserve tube 15. The reserve tube 152 extends about the pressure tube 106, e.g., circumstantially surrounding the pressure tube 106. The reserve tube 152 defines the reserve chamber 132 between the pressure tube 106 and the reserve tube 152.

The valve 154 controls fluid flow out of the second opening 128 of the third wall 124 from the passage 130 to the reserve chamber 132. The valve 154 may be an electromechanical valve 154 that selectively permits and restricts fluid flow through the second opening 128, e.g., in response to a command from a computer or other electronic control unit. The valve 154 may include a solenoid and ferromagnetic core, a spring, a rubber gasket or seal, and/or any other suitable structure. The valve 154 may vary an amount of fluid that can flow through the second opening 128, e.g., by controlling a size of a fluid flow path at the second opening 128. Controlling the amount of fluid that can flow through the second opening 128 controls dampening characteristics of the damper 100, e.g., permitting a lesser amount of fluid flow provides increased resistance to movement of the piston 110 as compared to permitting a greater amount of fluid flow. The valve 154 may interface with the fluid connector 118 at the third wall 124, e.g., the valve 154 may seal against the planar outer surface of the third wall 124.

The fluid connector 118 may provide the damper 100 with precise response characteristics in a shorter amount of time, e.g., compared to conventional designs. For example, fluid flowing through the decreased volume of the passage 130 compared to conventional designs may have a lower fluid flow inertia, providing quicker response to match the fluid flow permitted by the valve 154. As another example, a decreased amount of internal surface area abutting the passage 130 compared to conventional designs may provide a lower amount of component flex and variability of the amount of volume in the passage 130, reducing uncontrolled variability in the damper 100.

The invention claimed is:

1. A damper, comprising:
a pressure tube extending about a longitudinal axis and defining an inner volume;
a piston attached to a piston rod and slidably disposed within the pressure tube, the piston dividing the inner volume of the pressure tube into a first working chamber and a second working chamber; and
a fluid connector having a first wall and a second wall, the first wall and the second wall each elongated along the longitudinal axis and fixed to the pressure tube along the longitudinal axis, the fluid connector having a third wall elongated along the longitudinal axis and extending from the first wall to the second wall;
wherein the pressure tube defines an opening at the first working chamber, and the third wall of the fluid connector defines an opening spaced from the opening of the pressure tube; and
wherein the first wall, the second wall, and the third wall define a passage extending from the opening of the pressure tube to the opening of the third wall.

2. The damper of claim 1, wherein the fluid connector defines a perimeter extending along the first wall and the second wall along the longitudinal axis and from the first wall to the second wall at opposing ends of the fluid connector, and wherein the perimeter is fixed to the pressure tube along the first wall and the second wall along the longitudinal axis and from the first wall to the second wall at opposing ends of the fluid connector.

3. The damper of claim 2, wherein the perimeter is arcuate between the first wall and the second wall.

4. The damper of claim 2, wherein the perimeter is linear along the first wall and the second wall along the longitudinal axis.

5. The damper of claim 2, wherein the perimeter conforms to the pressure tube.

6. The damper of claim 2, wherein the fluid connector is fixed to the pressure tube at the perimeter extending along the first wall and the second wall along the longitudinal axis and from the first wall to the second wall at the opposing ends of the fluid connector.

7. The damper of claim 2, further comprising a weld fixing the fluid connector to the pressure tube, the weld extending completely about the perimeter.

8. The damper of claim 1, further comprising a valve that controls fluid flow from the passage.

9. The damper of claim 8, wherein the valve interfaces with the third wall at the opening of the third wall.

10. The damper of claim 8, further comprising a reserve tube extending about the fluid pressure tube such that a reserve chamber is defined between the pressure tube and the reserve tube, and wherein the valve controls flow from the passage to the reserve chamber.

11. The damper of claim 1, wherein the opening of the third wall is spaced from the opening of the pressure tube toward the second working chamber.

12. The damper of claim 1, wherein the third wall is planar.

13. The damper of claim 1, further comprising a valve that controls fluid flow through the opening of the third wall.

14. The damper of claim 1, wherein each of the first wall and the second wall extend perpendicular to the longitudinal axis.

15. The damper of claim 1, wherein the opening of the fluid connector is spaced from the opening of the third wall along the longitudinal axis.

16. A damper, comprising:
a pressure tube extending about a longitudinal axis and defining an inner volume;
a piston attached to a piston rod and slidably disposed within the pressure tube, the piston dividing the inner volume of the pressure tube into a first working chamber and a second working chamber;

a fluid connector having a first wall and a second wall, the first wall and the second wall each elongated along the longitudinal, the fluid connector having a third wall elongated along the longitudinal axis and extending from the first wall to the second wall; and a gasket between the fluid connector and the pressure tube, the gasket extending along the first wall the second wall along the longitudinal axis;

wherein the pressure tube defines an opening at the first working chamber, and the third wall of the fluid connector defines an opening spaced from the opening of the pressure tube; and wherein the first wall, the second wall, and the third wall define a passage extending from the opening of the pressure tube to the opening of the third wall.

17. The damper of claim 16, wherein the fluid connector defines a perimeter extending along the first wall and the second wall along the longitudinal axis and from the first wall to the second wall at opposing ends of the fluid connector, and wherein the gasket extends completely about the perimeter.

18. The damper of claim 17, wherein the perimeter is linear along the first wall and the second wall along the longitudinal axis.

19. The damper of claim 16, further comprising a valve that controls fluid flow through the opening of the third wall.

20. The damper of claim 16, further comprising a fastener fixed to an outer surface of the pressure tube, and wherein the fastener extends through the fluid connector.

* * * * *